US008310763B2

(12) United States Patent
Sarayeddine et al.

(10) Patent No.: US 8,310,763 B2
(45) Date of Patent: Nov. 13, 2012

(54) INFORMATIVE EYEGLASSES

(75) Inventors: Khaled Sarayeddine, Rennes (FR); Guilhem Dubroca, Rennes (FR); Pascal Benoit, Rennes (FR)

(73) Assignee: Optinvent, Rennes (FR)

( * ) Notice: Subject to any disclaimer, the term of this patent is extended or adjusted under 35 U.S.C. 154(b) by 195 days.

(21) Appl. No.: 12/936,329

(22) PCT Filed: Mar. 27, 2009

(86) PCT No.: PCT/EP2009/053666
§ 371 (c)(1),
(2), (4) Date: Nov. 5, 2010

(87) PCT Pub. No.: WO2009/121810
PCT Pub. Date: Oct. 8, 2009

(65) Prior Publication Data
US 2011/0051078 A1    Mar. 3, 2011

(30) Foreign Application Priority Data

Apr. 3, 2008   (FR) ..................................... 08 52207

(51) Int. Cl.
*G02B 27/14*   (2006.01)
*G09G 5/00*    (2006.01)

(52) U.S. Cl. .......................................... 359/630; 345/8

(58) Field of Classification Search .................. 351/158, 351/41; 359/618, 630; 345/8, 32
See application file for complete search history.

(56) References Cited

U.S. PATENT DOCUMENTS

| 2,378,301 | A | 6/1945 | Kaprelian |
| 7,068,404 | B2 * | 6/2006 | Ouchi et al. ................... 359/15 |
| 7,242,527 | B2 * | 7/2007 | Spitzer et al. ................. 359/630 |
| 7,391,573 | B2 * | 6/2008 | Amitai ......................... 359/630 |
| 2006/0228073 | A1 | 10/2006 | Mukawa et al. |

FOREIGN PATENT DOCUMENTS

| EP | 1 385 023 | 1/2004 |
| FR | 2 873 212 | 1/2006 |
| JP | 2002-162598 | 6/2002 |
| SU | 1 691 809 | 11/1991 |

OTHER PUBLICATIONS

International Search Report for PCT/EP2009/053666, mailed Jun. 12, 2009.
International Search Report for PCT/EP2009/053666, mailed Dec. 16, 2010.

* cited by examiner

*Primary Examiner* — Hung Dang
(74) *Attorney, Agent, or Firm* — Nixon & Vanderhye PC

(57) ABSTRACT

The invention relates to informative eyeglasses (500) comprising: —an optical guide (514) forming an eyeglass lens (500) and exhibiting an injection section (504) and an extraction section (508), —a catadioptric collimator (150) comprising: —a refractive entrance surface (202), a first reflecting surface (204), a second reflecting surface (206) and a refractive exit surface (208), each surface (202, 204, 206, 208) constituting a surface of revolution with the same axis of revolution, said axis of revolution constituting the optical axis (102) of the collimator (150), —an illumination source (104) generating an incident light beam (108) illuminating the refractive entrance surface (202), and the axis of which is shifted with respect to said optical axis (102) and which is substantially in the focal plane of said catadioptric collimator (150).

8 Claims, 4 Drawing Sheets

Figure 1:
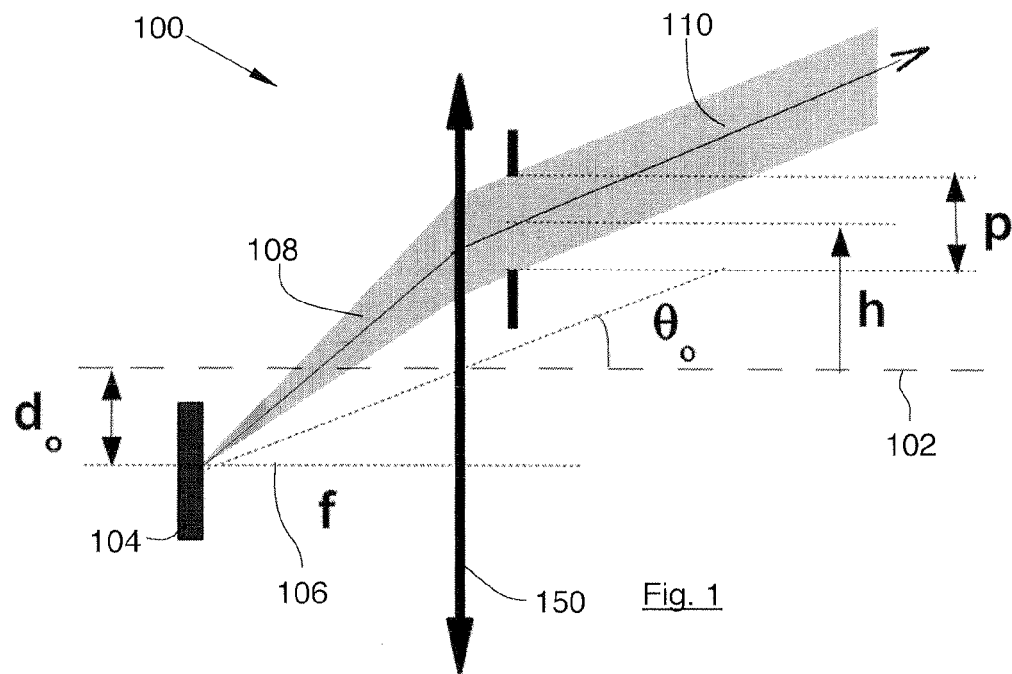

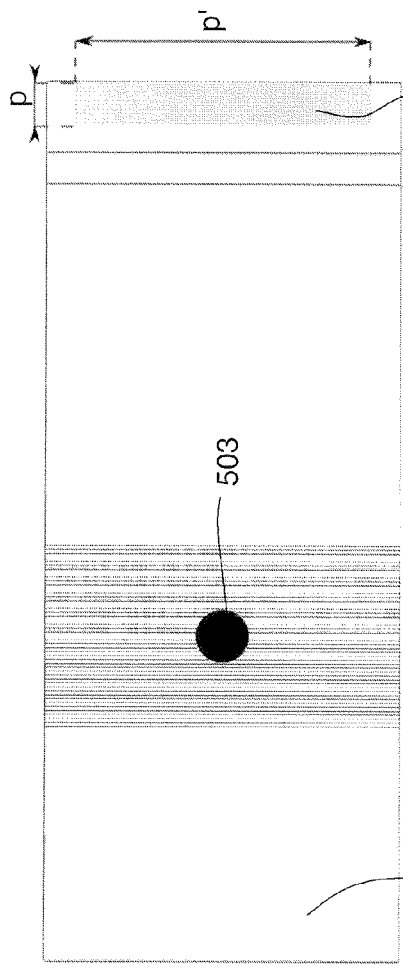
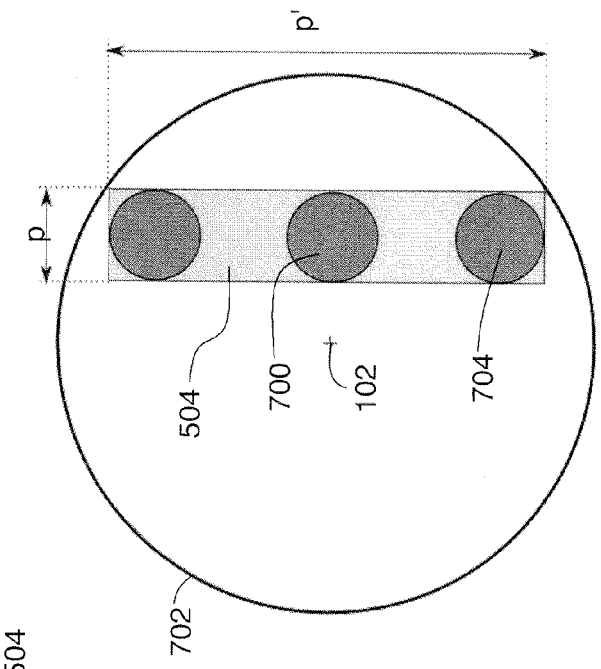
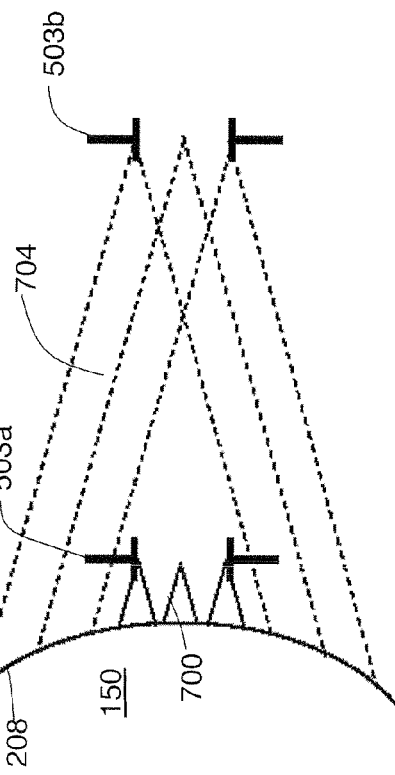

INFORMATIVE EYEGLASSES

This application is the U.S. national phase of International Application No. PCT/EP2009/053666, filed 27 Mar. 2009, which designated the U.S. and claims priority to French Application No. 08/52207, filed 3 Apr. 2008, the entire contents of each of which are hereby incorporated by reference.

The present invention concerns informative eyeglasses comprising a catadioptric collimator.

The document FR-A-2 873 212 discloses informative eyeglasses comprising a screen and an optical element that emits a light flux in an optical insert but the implantation of these elements is not sufficiently described. In particular, it is not specified how these elements make it possible to obtain an image the dimensions, in particular, vertical, of which are large.

An object of the present invention is to propose informative eyeglasses that do not have the drawbacks of the prior art.

To this end, informative eyeglasses are proposed, comprising:
- an optical guide forming an eyeglass lens and having an injection section and an extraction section,
- a catadioptric collimator comprising:
  - a refractive entrance surface, a first reflecting surface, a second reflecting surface and a refractive exit surface, each surface constituting a surface of revolution with the same axis of revolution, the said axis of revolution constituting the optical axis of the collimator,
- an illumination source generating an incident light beam illuminating the refractive entrance surface, and the axis of which is shifted with respect to the said optical axis and is substantially in the focal plane of the said catadioptric collimator, the surfaces being
- such that incident light beam is successively refracted by the refractive entrance surface, reflected by the first reflecting surface, reflected by the second reflecting surface and refracted by the refractive exit surface as an exiting light beam, and
- such that the exiting light beam is collimated substantially to infinity parallel to a direction forming a non-zero angle of inclination with the said optical axis, the catadioptric collimator and the illumination source being such that the exiting light beam enters the optical guide through the injection section and is extracted as a light beam extracted by the extraction section.

Advantageously, the injection section is in the form of a rectangular surface of width "p" and height "p'" greater than p.

Advantageously, the catadioptric collimator is in a single piece.

Advantageously, the informative eyeglasses comprise an arm and the catadioptric collimator and the illumination source are disposed on the said arm.

Advantageously, the first reflecting surface is convex and the refractive exit surface is convex.

Advantageously, the refractive entrance surface is concave and the second reflecting surface is concave.

Advantageously, the refractive entrance surface, the first reflecting surface, the second reflecting surface and the refractive exit surface are even asphere surfaces.

Advantageously, the illumination source is bonded to the refractive entrance surface.

Figure 2:
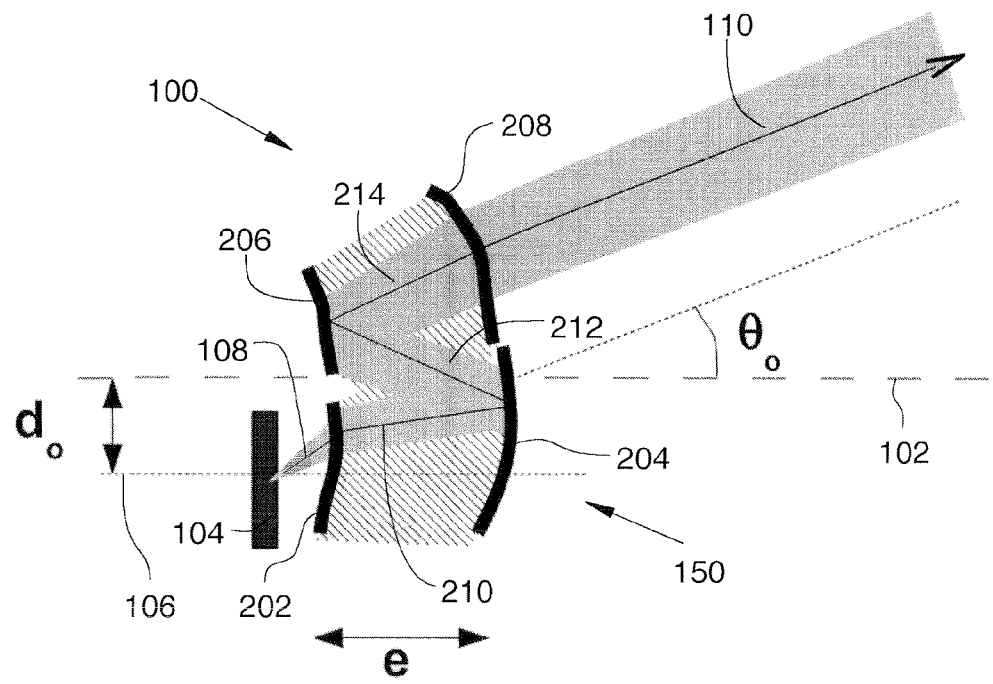
Figure 3:
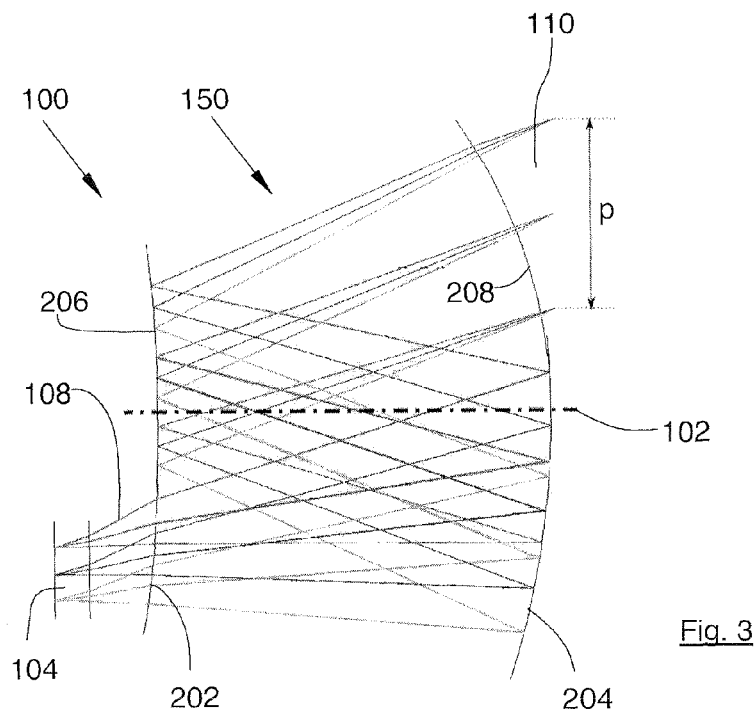
Figure 4:
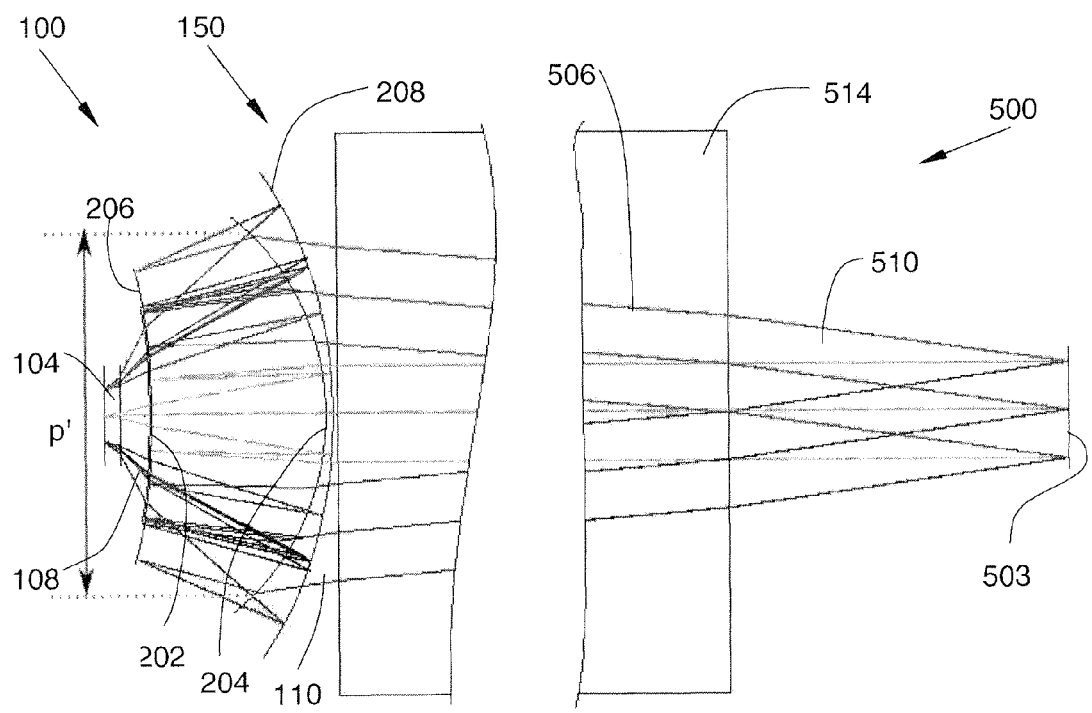
Figure 5:
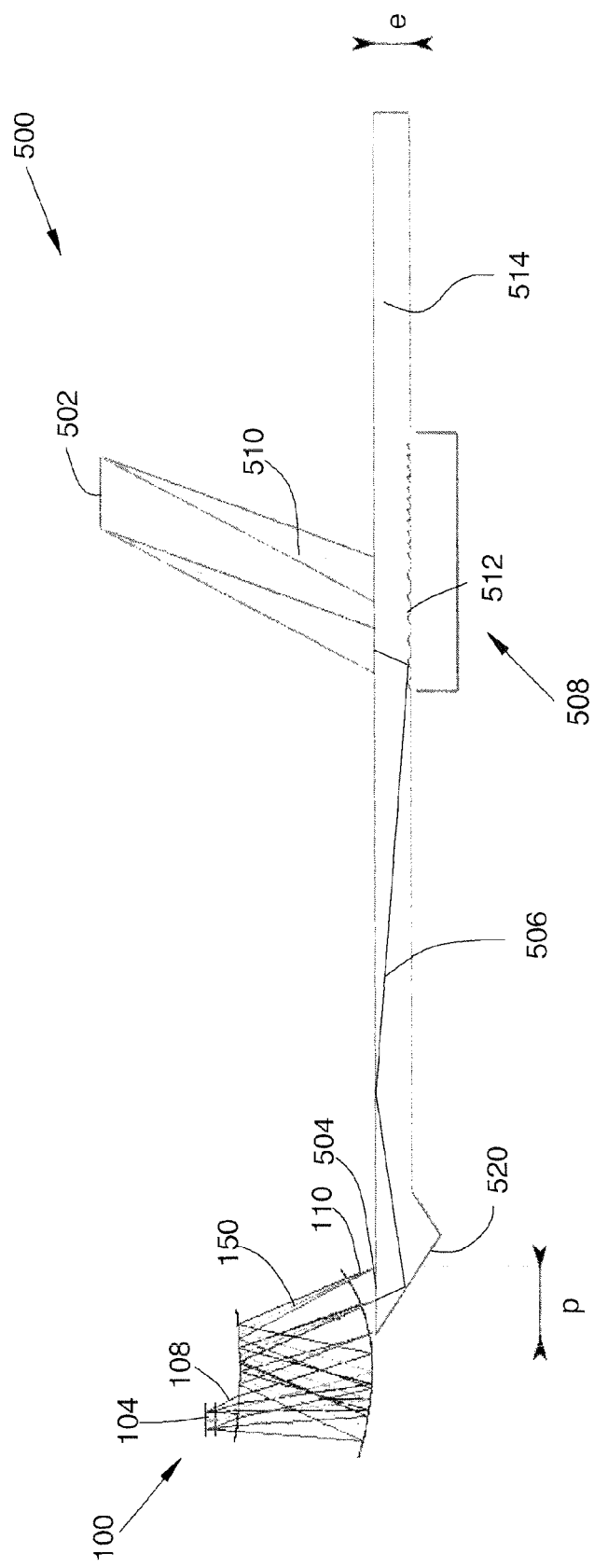

The features of the invention mentioned above, as well as others, will emerge more clearing from a reading of the following description of an example embodiment, the said description being given in relation to the accompanying drawings, among which:

FIG. 1 is a theoretical schematic representation of an optical projector used in informative eyeglasses according to the invention, FIG. 2 is a schematic representation of the optical projector used in informative eyeglasses according to the invention in plan view, FIG. 3 is a representation similar to that in FIG. 2, in which a plurality of optical paths have been shown, FIG. 4 is a schematic representation of the optical projector of FIG. 3 in side view, FIG. 5 is a plan view of the informative eyeglasses according to the invention, FIG. 6 is a front view of the informative eyeglasses according to the invention, FIG. 7 shows schematically a comparison between the optical projector of the invention and an optical projector of the prior art, FIG. 8 is a schematic representation of the dual-mode functioning of a catadioptric collimator used in informative eyeglasses according to the invention.

In the remainder of the description, the terms relating to positions, such as for example "above" or "horizontal" are expressed in relation to informative eyeglasses according to the invention as used, that is to say when the person wearing them is seated or standing and of which FIG. 6 is considered to be a front view and FIG. 5 is considered to be a plan view and FIG. 4 is considered to be a side view.

FIG. 1 shows a theoretical representation of an optical projector 100 used in informative eyeglasses according to the invention in plan view. The optical projector 100 comprises an illumination source 104 and a catadioptric collimator 150 comprising an optical axis 102.

The illumination source 104 may for example be a backlit OLED or LCD screen or other. The illumination source 104 is preferably flat and rectangular in shape. The normal to the plane of the illumination source 104 is referenced 106 and is parallel to the optical axis 102 but is not merged with the latter. The distance between the normal 106 and the optical axis is denoted "$d_0$". The illumination source 104 is placed substantially in the focal plane of the catadioptric collimator 150, that is to say at a distance denoted "f". The illumination source 104 is said to be at the focal plane even if it is slightly distant from this plane since the optical projector 100 makes it possible to view a sharp projected image. According to a preferred embodiment, the illumination source 104 is said to be at the focal plane when its position is distanced by less than 10% of "f".

The catadioptric collimator 150 is a single-piece assembly the form of which is explained below.

An incident light beam 108, issuing from the illumination source 104, illuminates the catadioptric collimator 150 and is diverted as an exiting light beam 110 that is collimated. The exiting light beam 110 has a general direction of propagation that exhibits, with the optical axis 102, a non-zero angle of inclination denoted "$\theta_0$". The presence of the angle of inclination $\theta_0$ is due in particular to the fact that the normal 106 to the illumination source 104 is not merged with the optical axis 102. The exiting light beam 110 is collimated substantially to infinity parallel to the direction forming the non-zero angle of inclination $\theta_0$ with the optical axis 102.

The exiting light beam 110 is considered to be collimated to infinity if the illumination source 104 is at the focal plane, which results in a parallel exiting light beam 110 issuing from the collimator 150 for a given point of the illumination source 104. The collimation may not be strictly to infinity but only to a great distance. According to a preferred embodiment, the exiting light beam 110 is considered to be collimated to infinity if the ratio between the distance of the projected image and the focal distance is greater than 50, where the distance of the projected image is determined by the sharpest image position.

FIG. 2 shows a plan view of the projector 100 and in particular of the catadioptric collimator 150. In the embodiment presented in FIG. 2, the illumination source 104 is distant from the catadioptric collimator 150 but may also be bonded to the catadioptric collimator 150 and in particular to the refractive entrance surface 202, so as to form an easily-manipulatable optical projector 100.

The catadioptric collimator 150 consists of an optical material, such as for example acrylic. The catadioptric collimator 150 is a single-piece assembly, which facilitates fitting and reduces the size of the optical projector 100. The catadioptric collimator 150 may be moulded, which facilitates development and reduces manufacturing costs.

The catadioptric collimator 150 has a refractive entrance surface 202, a first reflecting surface 204, a second reflective surface 206 and a refractive exit surface 208.

The four surfaces 202, 204, 206 and 208 are surfaces of revolution that all have the same axis of revolution, which is the optical axis 102 presented above and constitutes the optical axis of the catadioptric collimator 150. The four surfaces 202, 204, 206 and 208 thus have a common axis of revolution 102, facilitating production and reducing the manufacturing costs of the catadioptric collimator 150, while obtaining very good performance.

The incident light beam 108 issuing from the illumination source 104 illuminates and is refracted by the refractive entrance surface 202. The light beam 210 thus refracted is reflected by the first reflecting surface 204. The light beam 212 thus reflected is reflected by the second reflecting surface 206. The light beam 214 thus reflected is refracted by the refractive exit surface 208 and becomes the exiting light beam 110.

The fact that the normal 106 to the illumination source 104 is not merged with the optical axis 102, that is to say the illumination source 104 is shifted with respect to the optical axis 102, avoids the superimposition of the intermediate beams 210, 212 and 214 in the catadioptric collimator 150. This is also due to the fact that the pupil of the system is shifted with respect to the optical axis 102 of the collimator 150, making it possible to select the light beams issuing from the light source 104 having a non-zero angle with the optical axis 102 of the collimator 150.

The surfaces 202, 204, 206 and 208 of the catadioptric collimator 150 are disposed so as to move the intermediate beams 210, 212 and 214 away from one another at each interface.

The compactness of the catadioptric collimator 150 and therefore of the optical projector 100 is improved because of the folding of the optical paths in the catadioptric collimator 150.

In a preferred embodiment presented in FIG. 2, the refractive entrance surface 202 is concave and the second reflective surface 206 is concave.

Preferably the optical power of the refractive entrance surface 202 is slightly positive.

Preferably the optical power of the second reflecting surface 206 is slightly negative.

Advantageously, the reflecting surface 204 is convex and the refractive exit surface 208 is convex.

Even if such an arrangement constitutes a preferred embodiment of the invention, other arrangements may also be suitable, provided that the exiting light beam 110 is collimated substantially to infinity and the intermediate light beams do not overlap.

FIG. 3 shows a view similar to one in FIG. 2, with the paths of several light beams issuing from different points on the illumination source 104.

The surfaces 202, 204, 206 and 208 are disposed with respect to one another so that, coming from the illumination source 104, each light beam is successively refracted by the refractive entrance surface 202, reflected by the first reflecting surface 204, reflected by the second reflecting surface 206 and refracted by the refractive exit surface 208.

The catadioptric collimator 150 is conformed so that, after the refractive exit surface 208, the exiting light beam 110 has horizontally a dimension called "pupil" and denoted "p" that is preferably around 4 mm.

FIG. 4 shows a side view of the projector 100 implemented in informative eyeglasses 500 according to the invention, with the paths of several light beams issuing from different points on the illumination source 104.

The exiting light beam 110 has vertically a dimension p' greater than the pupil p and is here around 12 mm at the exit from the refractive exit surface 208. The limitations of the exiting light beam 110 are in particular due to the form of the refractive exit surface 208 which, vertically, has a length of approximately p' and horizontally has a length p. In particular, the horizontal length is limited on one of the sides by the first reflecting surface 204, which is covered with a reflecting coating that prevents any transmission.

The exit beam 110 enters an optical guide 514, which is a lens of the informative eyeglasses 500, and emerges therefrom in the form of an extracted light beam 510 that enters the pupil 503 of the eye of the observer.

In the vertical direction, the beams are not necessarily limited in position to the exit of the collimator 150 and, in the case of informative eyeglasses, the vertical pupil is situated in front, level with the eye of the observer.

In the embodiment presented here, the catadioptric collimator 150 has horizontally a dimension of around 10 mm and vertically a dimension of around 20 mm.

FIG. 5 shows a plan view of the informative eyeglasses 500 the lenses 514 of which, of thickness "e", constitute the optical guide.

The optical projector 100 can be incorporated in one of the arms of the eyeglasses 500.

The exiting light beam 110 enters the optical guide 514 through an injection section 504.

The injection section 504 is in the form of a rectangular flat surface of width "p" and height "p'". The injection section 504 is disposed perpendicular to the axis 102, opposite the refractive exit surface 208 so as to capture the exiting light beam 110. The exiting light beam 110 then enters the optical guide 514 and then bears the reference 506.

The injection section 504 has a rear face 520 that is oriented so that, when the light beam 506 reaches it, it is diverted to the extraction section 508.

The light beam 506 is then transported in the optical guide 514 over an arbitrary length. The optical guide 514 consists of a material transparent to light and has two parallel faces. The light beam 506 is guided by these two faces and propagates by total reflection in the guide. If the index of the transparent material making up the guide is higher than that of the media that surround it, total internal reflection occur naturally provided that the angle of incidence of the rays of the beam is sufficiently small with respect to the face of the guide. Alternatively, if the external indices are greater or equal, it is possible to have a deposit of thin films of dielectric material in order to supplement within certain limits the condition of total internal reflection. The light beam 506 then arrives in an area called the extraction section 508, which enables the light beam 506 to re-emerge from the optical guide 514. This extraction zone 508 is situated on one of the faces of the optical guide 514. It will make it possible to return the light beam 506 to the other face at substantial perpendicular angle that will enable it to exit from the optical guide 514. The light beam 510, thus extracted from the optical guide 514, can then be projected towards the eye 502 of the user.

The extraction section 508 is a section comprising microstructures that are here disposed on the surface on one of the faces of the optical guide 514, and the extracted light rays then exit through the opposite face of the optical guide 514. The microstructures may be refractive or reflexive. The structure may be uni-dimensional, composed of extracting lines, or bi-dimensional, formed by a mosaic of extracting elements. The extracting elements are, for example, prisms with a flat face, the active angle of which is constant along the structure. The size and arrangement of these structures depend on the application using the guide. In the case of an ocular vision optical system, the size of the microstructures will advantageously be small compared with the size of the pupil of the eye, for example around a few tens of μm. In this way, the image does not vary according to the position and movements of the eye. Because of their size and their short distance from the eye, these microstructures are also invisible through the naked eye. Moreover, these microstructures do not fully cover the face of the guide; the latter remains transparent and affords vision through the guide while viewing the image issuing from the guide. The system is said to be see through.

The extraction system may consist of semi-reflective inclined sections.

According to a preferred embodiment of the microstructures, each microstructure 512 forms a reflecting prism projecting on the face of the optical guide 514 that is opposite to the eye 502. An incident ray of the light beam 506, which strikes the inclined face of the microstructure 512, is reflected towards the second face of the guide at an angle close to the normal to this face. Because of this the ray reflected by the microstructure 512 is not reflected by the second face and exits from the optical guide in order to form the extracted light beam 510. The microstructure 512 is formed on the face opposite to the exit face of the image.

The dimension of 4 mm of the pupil p is particularly advantageous in this application since the optical guide 514 has, for an angle of injection in the injection section 514 of around 30°, a thickness "e" of 2 mm and the diameter of the pupil of eye 502 is around 4 mm.

An example of a particular embodiment of the catadioptric collimator 150 will now be given in the case of a field of vision of 18°.

The refractive entrance surface 202, the first reflecting surface 204, the second reflecting surface 206 and the refractive exit surface 208 are here even asphere surfaces the deflection "z" of which is given by the formula:

$$z(r) = \frac{\frac{r^2}{R}}{1 + \sqrt{1 - (1+k)\frac{r^2}{R^2}}} + \sum_i \beta_i \cdot r^i \tag{1}$$

where, for each surface 202, 204, 206, 208, "r" is the radius at the centre, "R" is the radius of curvature, "k" is the conicity, and $\beta_i$ are constants for adjusting the coefficient of conicity according to the position.

The illumination source 104 is at a distance $d_0 = 3.06$ mm from the optical axis 102. The incident light beam 108 travels 0.5 mm in air before reaching the refractive entrance surface 202 of the catadioptric collimator 150, which is here made from acrylic.

For the refractive entrance surface 202, which is here concave, r=4.3484095 mm and R=−59.20 mm and k=0.

For the first reflecting surface 204, which is here optically concave, r=8.984715 mm and R=18 mm and k=0.6.

For the second reflecting surface 206, which is here optically convex, r=5.31096 mm and R=31.25 mm and k=21.8.

For the refractive exit surface 208, which is here convex, r=7.488155 mm and R=12.6 mm and k=0.6.

The distance between the top of the refractive entrance surface 202 and the top of the first reflecting surface 204 is 9.864 mm.

The distance between the top of the first reflecting surface 204 and the top of the second reflecting surface 206 is 9.864 mm.

The distance between the top of the second reflecting surface 206 and the top of the refractive exit surface 208 is 9.864 mm.

The following table summarises the constants β for each surface 202, 204, 206, 208 according to the power of "r".

| Surface | power | | | |
| --- | --- | --- | --- | --- |
| | $r^2$ | $r^4$ | $r^6$ | $r^8$ |
| Refractive entrance surface (202) | 0 | 0.0011892508 | −4.2057978e−005 | 5.7193979e−007 |
| First reflecting surface (204) | 0 | −4.05843521e−006 | −3.4650905e−009 | −1.1423817e−010 |
| Second reflecting surface (206) | 0 | −1.46021005e−005 | −1.6758156e−007 | −1.7946628e−008 |
| Refractive exit surface (208) | 0 | −3.3410654e−005 | −9.4958857e−008 | −4.072712e−009 |

In the embodiment presented here, the pupil p is 4 mm and the angle of inclination $\theta_0$ is 22.5°. The distance denoted "h" represents the distance between the optical axis 102 and the centre of the pupil p is 4.5 mm.

FIG. 6 is a front view of the informative eyeglasses 500.

Fitting the optical guide 514 following the catadioptric collimator 150 makes it possible to limit horizontally the passage of the exiting light beam 110 to the width p, which is here 4 mm, whereas vertically it imposes no significant limit. This is because, horizontally, the light beam 506 that is conveyed inside the optical guide 514 is guided by total internal reflection on the faces of the said optical guide 514, which are distant by a relatively small thickness "e", which is here around 2 mm. It is the separation of the parallel faces of the optical guide 514 that limits the exit width of the catadioptric collimator 150. Whereas vertically the light beam 506 follows its path without being diverted in this way until it is intercepted by the pupil 503 of the eye of the observer. This imposes the exit height of the collimator p'.

FIG. 7 is a comparative representation of the injection section 504 in the context of the invention and an optical system of the prior art.

The injection section 504 is illuminated by the exiting light beam 110, three of the useful beams 700, 704 of which have been shown, the two end useful beams 704 and the middle useful beam 700. The projection of each of these useful beams 700, 704 is in the form of a circle of diameter p and the maximum distance between the external limits of the end useful beams 700, 704 is p'. Thus the exiting light beam 110 fits in the rectangle of width p and height p' that corresponds to the injection section 504.

In the optical systems of the prior art where the optical surfaces have a common axis of revolution (D), the light beams selected by the objective that are emitted by the points on the object situated at a certain distance "r" from this optical axis (D) are all identical to within a rotation around (D), which is not the case in the context of the invention, since the entering light beam 108 emitted by the illumination source 104 does not have symmetry of rotation about the optical axis 102.

The catadioptric collimator 150 according to the invention constitutes the restriction to a small opening of an optical system having a larger opening.

Thus, if an objective with a large opening and the same focal length had the circle referenced 702 as its exit pupil, it would produce a good image. However, in order to produce the image to be projected, it is only necessary to produce useful light beams 700, 704 with small diameters, since the pupil 503 of a human eye 502 is relatively small (approximately 4 mm in diameter).

As an objective with a large opening is complicated to produce, the limitation to useful light beams 700, 704 with small dimensions is advantageous. The arrangement proposed by the invention makes it possible to produce an objective with a focal length of approximately 8.5 mm and a high opening of 12 mm, which would represent a very large opening for an objective of the prior art.

The image generated by the illumination source 104 has a certain height and, the greater the height, the larger p' is compared with p. The distance traveled in the optical guide 514 is around 40 mm and the distance traveled in air as far as the pupil 503 of the eye is around 15 mm, and the total distance is relatively great (55 mm). Because of this great total length, an angular height of the image of a few degrees means that p'/p is greater than 2. It is even preferably around 3, but higher values are possible.

FIG. 8 is a schematic representation of the horizontal and vertical dual-mode functioning of the catadioptric collimator 150. For reasons of clarity, the optical guide is not shown.

The catadioptric collimator 150 functions according to two modes simultaneously.

In the first mode, for useful light beams 700 situated on a horizontal line, the catadioptric collimator 150 behaves as an eyepiece designed to function with a pupil 503a of the eye close to the refractive exit surface 208.

In the second mode, for useful beams 704 situated on a vertical line, the catadioptric collimator 150 behaves as an eyepiece designed to function with a pupil 503b distant from this same refractive exit surface 208.

In the case of informative eyeglasses 500, the optical guide 514 can be produced in glass with an index n=1.6 reference S-TIM8 from OHARA GmbH. The optical guide has a thickness of 2 mm and the eye 502 is at a distance of 15 mm from the optical guide 514.

Naturally the present invention is not limited to the examples and embodiments described and depicted but is capable of numerous variants accessible to persons skilled in the art.

The invention claimed is:

1. Informative eyeglasses (500) comprising:
    an optical guide (514) forming an eyeglass lens (500) and having an injection section (504) and an extraction section (508),
    a catadioptric collimator (150) comprising:
        a refractive entrance surface (202), a first reflecting surface (204), a second reflecting surface (206) and a refractive exit surface (208), each surface (202, 204, 206, 208) constituting a surface of revolution with the same axis of revolution, the said axis of revolution constituting the optical axis of the collimator (150),
    an illumination source (104) generating an incident light beam (108) illuminating the refractive entrance surface (202), and the axis of which is shifted with respect to the said optical axis (102) and is substantially in the focal plane of the said catadioptric collimator (150),
    the surfaces (202, 204, 206, 208) being
        such that incident light beam (108) is successively refracted by the refractive entrance surface (202), reflected by the first reflecting surface (204), reflected by the second reflecting surface (206) and refracted by the refractive exit surface (208) as an exiting light beam (110), and
        such that the exiting light beam (110) is collimated substantially to infinity parallel to a direction forming a non-zero angle of inclination ($\theta_0$) with the said optical axis (102),
    the catadioptric collimator (150) and the illumination source (104) being such that the exiting light beam (110) enters the optical guide (514) through the injection section (504) and is extracted as a light beam extracted (510) by the extraction section (508).

2. Informative eyeglasses (500) according to claim 1, wherein the injection section (504) is in the form of a rectangular surface of width "p" and height "p'" greater than p.

3. Informative eyeglasses (500) according to claim 1, wherein the catadioptric collimator (150) is in a single piece.

4. Informative eyeglasses (500) according to claim 1, wherein they comprise an arm and in that the catadioptric collimator (150) and the illumination source (104) are disposed on the said arm.

5. Informative eyeglasses (500) according to claim 1, wherein the first reflecting surface (204) is convex and the refractive exit surface (208) is convex.

6. Informative eyeglasses (500) according to claim 5, wherein the refractive entrance surface (202) is concave and the second reflecting surface (206) is concave.

7. Informative eyeglasses (500) according to claim 1, wherein the refractive entrance surface (202) the first reflecting surface (204), the second reflecting surface (206) and the refractive exit surface (208) are even asphere surfaces.

8. Informative eyeglasses (500) according to claim 1, wherein the illumination source (104) is bonded to the refractive entrance surface (202).

* * * * *